(12) United States Patent
Tinnakornsrisuphap et al.

(10) Patent No.: US 9,173,239 B2
(45) Date of Patent: *Oct. 27, 2015

(54) CONNECTED-STATE RADIO SESSION TRANSFER IN WIRELESS COMMUNICATION SYSTEMS

(71) Applicant: QUALCOMM Incorporated, San Diego, CA (US)

(72) Inventors: Peerapol Tinnakornsrisuphap, San Diego, CA (US); Parag Arun Agashe, San Diego, CA (US); Ramin Rezaiifar, San Diego, CA (US); Bibhu P Mohanty, San Diego, CA (US); Paul E Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/947,431

(22) Filed: Jul. 22, 2013

(65) Prior Publication Data

US 2013/0303222 A1  Nov. 14, 2013

Related U.S. Application Data

(63) Continuation of application No. 11/123,658, filed on May 6, 2005, now Pat. No. 8,515,424.

(60) Provisional application No. 60/650,334, filed on Feb. 4, 2005, provisional application No. 60/635,041, filed on Dec. 9, 2004, provisional application No. 60/576,194, filed on Jun. 1, 2004.

(51) Int. Cl.
*H04W 36/00* (2009.01)
*H04W 76/02* (2009.01)
(Continued)

(52) U.S. Cl.
CPC .............. *H04W 76/02* (2013.01); *H04W 36/10* (2013.01); *H04W 36/12* (2013.01)

(58) Field of Classification Search
CPC ............................. H04W 36/30; H04W 36/32
See application file for complete search history.

(56) References Cited

U.S. PATENT DOCUMENTS 4,916,691 A   4/1990   Goodman
5,872,773 A   2/1999   Katzela et al.
(Continued)

FOREIGN PATENT DOCUMENTS

EP    0366342 A2   5/1990
EP    1383292 A1   1/2004
(Continued)

OTHER PUBLICATIONS

3GPP2, "CDMA2000 High Rate Packed Data Air Interface Specification" 3GGP2 C.S0024-A Version 1.0, XP-002382113 (Mar. 2004).
(Continued)

*Primary Examiner* — Justin Lee
(74) *Attorney, Agent, or Firm* — John J. Ketchum

(57) ABSTRACT

Embodiments described herein relate to connected-state radio session transfer in wireless communications. A target access network controller may create a radio session associated with an access terminal, the radio session corresponding with a source radio session at a source access network controller. The target access network controller may also establish a communication route between a data network and the access terminal via the target access network controller. The target access network controller may further receive a frozen state associated with the source radio session from the source access network controller. In an aspect, the frozen state may include a snapshot of any data being communicated through the source radio session when freezing occurred. The target access network controller may subsequently unfreeze the received state.

19 Claims, 12 Drawing Sheets

(51) Int. Cl.
  *H04W 36/10* (2009.01)
  *H04W 36/12* (2009.01)

(56) References Cited

U.S. PATENT DOCUMENTS

| | | | |
|---|---|---|---|
| 6,125,122 | A | 9/2000 | Favichia et al. |
| 6,252,862 | B1 | 6/2001 | Sauer et al. |
| 6,473,100 | B1 | 10/2002 | Beaumont et al. |
| 6,473,411 | B1 | 10/2002 | Kumaki et al. |
| 6,477,157 | B1 | 11/2002 | Kim et al. |
| 6,647,001 | B1 | 11/2003 | Bhagavath et al. |
| 6,674,713 | B1 | 1/2004 | Berg et al. |
| 6,781,999 | B2 | 8/2004 | Eyuboglu et al. |
| 6,876,640 | B1 | 4/2005 | Bertrand et al. |
| 6,930,988 | B2 | 8/2005 | Koodli et al. |
| 6,968,190 | B1 * | 11/2005 | Suumaki et al. .............. 455/436 |
| 7,069,013 | B2 | 6/2006 | Pedziwiatr et al. |
| 7,089,009 | B1 | 8/2006 | Fauconnier |
| 7,151,758 | B2 | 12/2006 | Kumaki et al. |
| 7,385,957 | B2 | 6/2008 | O'neill |
| 7,583,634 | B2 | 9/2009 | Gillies et al. |
| 2001/0048662 | A1 | 12/2001 | Suzuki et al. |
| 2002/0018010 | A1 | 2/2002 | Le |
| 2003/0018908 | A1 | 1/2003 | Mercer et al. |
| 2003/0139183 | A1 | 7/2003 | Rantalainen |
| 2004/0100951 | A1 | 5/2004 | O'Neill |
| 2005/0015584 | A1 | 1/2005 | Takechi et al. |
| 2005/0266847 | A1 | 12/2005 | Tinnakornsrisuphap et al. |
| 2006/0083184 | A1 * | 4/2006 | Haumont et al. ............. 370/278 |

FOREIGN PATENT DOCUMENTS

| | | |
|---|---|---|
| EP | 2053899 | 4/2009 |
| JP | 2244850 A | 9/1990 |
| JP | 2001509652 A | 7/2001 |
| JP | 2001345847 A | 12/2001 |
| JP | 2002084563 A | 3/2002 |
| JP | 2002528976 A | 9/2002 |
| JP | 2003500981 A | 1/2003 |
| JP | 2003515995 A | 5/2003 |
| JP | 2004120547 A | 4/2004 |
| KR | 20010065932 | 7/2001 |
| WO | 0072485 A1 | 11/2000 |
| WO | 0139525 | 5/2001 |
| WO | 03041430 A1 | 5/2003 |
| WO | 03041436 A1 | 5/2003 |

OTHER PUBLICATIONS

European Search Report—EP10177331, Search Authority—The Hague Patent Office, Oct. 27, 2010.
International Search Report, PCT/US2005/019377—International Search Authority —European Patent Offfice, Feb. 24, 2010.
Taiwan Search Report—TW094118037—TIPO—Jun. 1, 2012.
Taiwan Search Report—TW94118037—TIPO—Sep. 7, 2012.
Written Opinion—PCT/US2005/019377—International Search Authority—European Patent Office, Feb. 24, 2006.

* cited by examiner

CONNECTED-STATE RADIO SESSION TRANSFER IN WIRELESS COMMUNICATION SYSTEMS

CLAIM OF PRIORITY

The present Application for Patent is a continuation of patent application Ser. No. 11/123,658 entitled "CONNECTED-STATE RADIO SESSION TRANSFER IN WIRELESS COMMUNICATION SYSTEMS," filed May 6, 2005, pending, which claims priority to:

Provisional Patent Application No. 60/650,334, entitled "RADIO NETWORK CONTROLLER HANDOFF," filed Feb. 4, 2005, Provisional Patent Application No. 60/635,041, entitled "RADIO NETWORK CONTROLLER HANDOFF," filed Dec. 9, 2004, and Provisional Patent Application No. 60/576,194, entitled "RADIO NETWORK CONTROLLER HAND OFF," filed Jun. 1, 2004, all of which are assigned to the Assignee hereof and hereby expressly incorporated by reference herein.

BACKGROUND

1. Field

This disclosure relates generally to wireless communications. More specifically, embodiments disclosed herein relate to connected-state radio session transfer in wireless communications.

2. Background

Wireless communication systems are widely deployed to provide various types of communication (e.g., voice, data, etc.) to multiple users. Such systems may be based on code division multiple access (CDMA), time division multiple access (TDMA), frequency division multiple access (FDMA), or other multiple access techniques. CDMA systems offer some desirable features, including increased system capacity. A CDMA system may be designed to implement one or more standards, such as IS-95, cdma2000, IS-856, W-CDMA, TD-SCDMA, and other standards.

As wireless communication systems strive to provide diverse services at high data rates to a growing number of users, a challenge lies in maintaining the quality of service and improving the network efficiency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with connected-state radio session transfer in wireless communications. A target access network controller may create a radio session associated with an access terminal, the radio session corresponding with a source radio session at a source access network controller. The target access network controller may also establish a communication route between a data network and the access terminal via the target access network controller. The target access network controller may further receive a frozen state associated with the source radio session from the source access network controller. In an aspect, the frozen state may include a snapshot of any data being communicated through the source radio session when freezing occurred. The target access network controller may subsequently unfreeze the received state.

According to related aspects, a method for connected-state radio session transfer is provided. The method can include creating a radio session associated with an access terminal at a target access network controller, the radio session corresponding with a source radio session at a source access network controller. Further, the method can include establishing a communication route between a data network and the access terminal via the target access network controller. Further, the method can include receiving a frozen state associated with the source radio session from the source access network controller. In an aspect, the frozen state may include a snapshot of any data being communicated through the source radio session when freezing occurred. Moreover, the method may include unfreezing the received frozen state.

Another aspect relates to a communications apparatus enabled to provide connected-state radio session transfer. The communications apparatus can include means for creating a radio session associated with an access terminal at a target access network controller, the radio session corresponding with a source radio session at a source access network controller. Further, the communications apparatus can include means for establishing a communication route between the access terminal and a data network via the target access network controller. Further, the communications apparatus can include means for receiving a frozen state associated with the source radio session from the source access network controller. In an aspect, the frozen state may include a snapshot of any data being communicated through the source radio session when freezing occurred. Moreover, the communications apparatus can include means for unfreezing the received frozen state.

Another aspect relates to a communications apparatus. The apparatus can include a session-creating unit configured to create a radio session associated with an access terminal at a target access network controller, the radio session corresponding with a source radio session at a source access network controller. Further, the apparatus may include a route-adding unit configured to establish a communication route between the access terminal and a data network via the target access network controller. Further, the apparatus may include a state-receiving unit configured to receive a frozen state associated with the source radio session from the source access network controller. In an aspect, the frozen state may include a snapshot of any data being communicated through the source radio session when freezing occurred. Moreover, the apparatus may include a state-unfreezing unit configured to unfreeze the received frozen state.

Still another aspect relates to a computer program product, which can have a computer-readable medium including instructions executable by a processor configured to create a radio session associated with an access terminal at a target access network controller, the radio session corresponding with a source radio session at a source access network controller. Further, the computer-readable medium instructions, executable by the processor, may be configured to establish a communication route between the access terminal and a data network via the target access network controller. Further, the computer-readable medium instructions, executable by the processor, may be configured to receive a frozen state associated with the source radio session from the source access network controller. In an aspect, the frozen state may include a snapshot of any data being communicated through the source radio session when freezing occurred. Moreover, the computer-readable medium instructions, executable by the processor, may be configured to unfreeze the received frozen state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5b-5c show an implementation of the embodiment of FIG. 5a;

DETAILED DESCRIPTION

Embodiments disclosed herein relate to methods and systems for transferring control of an access terminal from one access network to another access network while the access terminal is in connected state.

Figure 1:
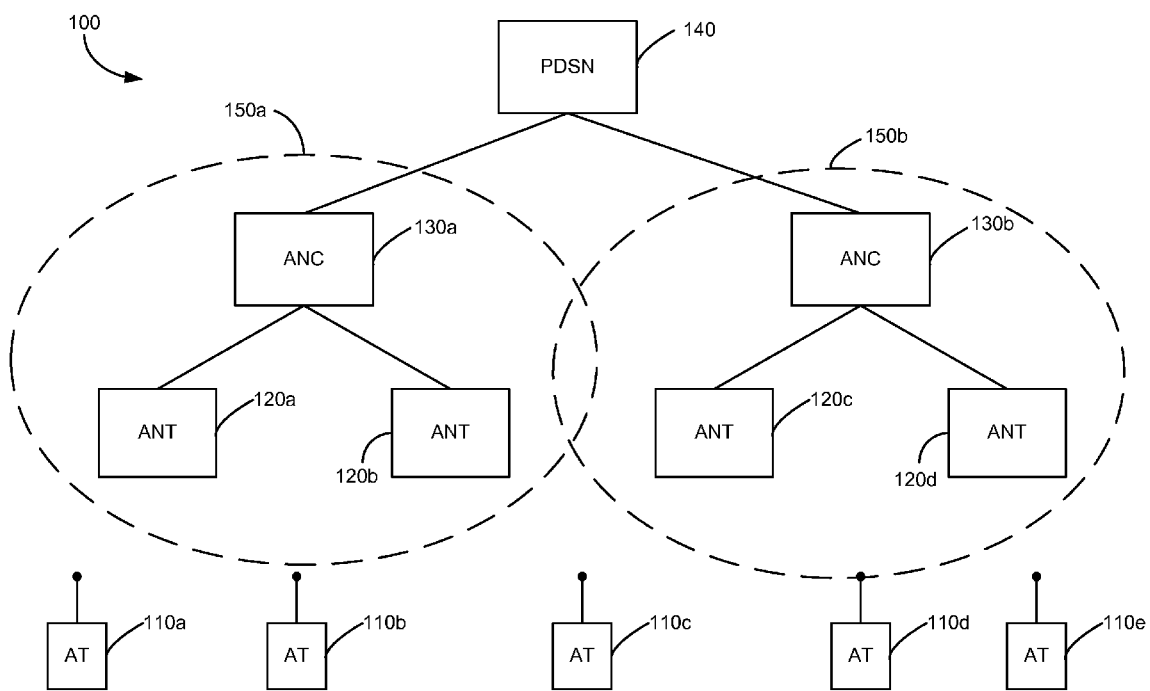
FIG. 1 shows a wireless communication system.

FIG. 1 illustrates a wireless communication system 100. By way of example, various access terminals (ATs) 110, including ATs 110a-110e, are dispersed throughout the system. Each AT 110 may communicate with one or more access network transceivers (ANTs) 120, such as ANTs 120a-120d, on a forward link and/or a reverse link at a given moment. One or more access network controllers (ANC) 130, such as ANCs 130a-130b, may be in communication with and serve to provide coordination of and control for ANTs 120. ANCs 130 may further be in communication with a data network, such as a packet data network via a packet data serving node (PDSN) 140. In one embodiment, system 100 may be configured to support one or more standards, e.g., IS-95, cdma2000, IS-856, W-CDMA, TD-SCDMA, some other spread-spectrum standards, or a combination thereof. These standards are known in the art.

As described herein, an ANC may refer to the portion of a communication system configured to interface with a core network (e.g., a packet data network via PDSN 140 in FIG. 1) and route data packets between ATs and the core network, perform various radio access and link maintenance functions (such as soft handoff), control radio transmitters and receivers (e.g., ANTs 120 in FIG. 1), and so on. An ANC may include and/or implement the functions of a base station controller (BSC), such as found in a $2^{nd}$ or $3^{rd}$ generation wireless network. An ANT may also be referred to as a base-station transceiver system (BTS), an access point (AP), a modem pool transceiver (MPT), or a Node B (e.g., in a W-CDMA type system). An ANC and one or more ANTs may constitute part of an access network (AN). In system 100, for example, ANC 130a and ANTs 120a, 120b may be part of an AN 150a, and ANC 130b and ANTs 120c, 120d may be part of an AN 150b.

Although the term "PDSN" is used explicitly herein, it is construed to represent a core (or data) network from and to which data packets flow. Data packets described herein may encapsulate a variety of contents (e.g., as specified by protocols such as Internet Protocol (IP)), including voice, audio, video, and other information contents (such as in an IS-856 type system).

An AT described herein may refer to various types of devices, including (but not limited to) a wired phone, a wireless phone, a cellular phone, a laptop computer, a wireless communication personal computer (PC) card, a personal digital assistant (PDA), an external or internal modem, etc. An AT may be any data device that communicates through a wireless channel or through a wired channel (e.g., by way of fiber optic or coaxial cables). An AT may have various names, such as access unit, subscriber unit, mobile station, mobile device, mobile unit, mobile phone, mobile, remote station, remote terminal, remote unit, user device, user equipment, handheld device, etc. Different ATs may be incorporated into a system. Access terminals may be mobile or stationary, and may be dispersed throughout a communication system. An AT may communicate with one or more ANTs on a forward link and/or a reverse link at a given moment. The forward link (or downlink) refers to transmission from an ANT (or AN) to an AT. The reverse link (or uplink) refers to transmission from the AT to the ANT (or AN).

An AT that has established a traffic channel connection with one or more ANTs (and hence ready to receive and/or transmit voice/data) is said to be in connected state. Soft handoff is a process in which a plurality of ANTs may control the reverse link transmit power of an AT and decode the reverse link signals from the AT (such ANTs are said to be in the AT's active set). The AT may also decode the forward link signals from at least one ANT in its active set. An AT may enter soft handoff, for example, when another ANT becomes available and provides a channel quality (e.g., as indicated by its pilot signal strength) at least comparable to the existing one. Soft handoff ensures that data packets/calls are not dropped as the AT moves out of the coverage area of one ANT and into the coverage area of another ANT, hence a "make-before-break" process. In contrast, hard handoff is a "break-before-make" process, in which an AT breaks the connection with the ANT(s) in the AT's active set before making a new connection with one or more ANTs which were not previously in the AT's active set. A "serving sector" may refer to an ANT in the AT's active set, which the AT selects for data communication.

The term "radio session" herein may refer to a shared state between an AT and an ANC (or AN). The shared state stores the protocols and configurations that have been negotiated and are used for communications between the AT and ANC. (See, e.g., the "cdma2000 High Rate Packet Data Air Interface Specification," 3GPP2 C.S0024-A, Version 1, March 2004, promulgated by the consortium "3rd Generation Partnership Project 2" for further details.)

A "source ANC" herein may refer to an ANC that holds and provides administrative control of the radio session associated with an AT prior to transferring of the radio session. The radio session may also include the automatic repeat request (ARQ) protocol used for signaling messages (e.g., signaling link protocols (SLPs) in IS-856). A "target ANC" may refer to an ANC to which a source ANC transfers the radio session associated with (and hence control of) an AT. The term "connected-state radio session transfer" may refer to a radio session transfer associated with an AT that is in connected state.

Consider AT 110c in system 100, where it is about moving out of the coverage area serviced by AN 150a and into a coverage area serviced by AN 150b, while in connected state (e.g., in data communication with PDSN 140 via ANT 120b and ANC 130a). Such transition may proceed in a hard handoff or soft handoff fashion. In the hard handoff situation, AT 110c completely breaks the connection with ANT 120b (hence ANC 130a and PDSN 140) before making a new connection, e.g., with ANT 120c (hence ANC 130b and PDSN 140). In the soft handoff situation, although AT 110c may communicate with ANT 120b as well as ANT 120c during the transition, ANC 130a retains the radio session associated with AT 110c and hence continues serving as the interface between PDSN 140 and ANTs for routing data packets to and from AT 110c. Such will be the case even after the handoff is complete and AT 110c is no longer in communication with any ANT in AN 150a (until the situation becomes untenable, e.g., when ANC 130a can no longer control ANT(s) sufficiently to communicate with AT 110c).

The hard handoff transition described above is undesirable, notably, for being disruptive to AT 110c being in connected state. The soft handoff transition described above is also inefficient and ultimately unsustainable (once the AT has moved further away from the source ANC). Hence, a need exists for radio session transfer, so as to ensure the quality of service and enhance the network efficiency.

Embodiments disclosed herein relate to methods and systems for providing connected-state radio session transfer in wireless communications.

In one embodiment, a method for connected-state radio session transfer in wireless communications is provided, including: locking a source radio session associated with an AT at a source ANC, the source ANC being in communication with a data network; instructing a target ANC to create a target radio session corresponding with the source radio session; instructing the target ANC to establish a communication route between the data network and the AT via the target ANC; and transferring a state associated with the source radio session to the target ANC. The transferring a state may include freezing (e.g., by taking a snapshot and holding any further operation of) a state associated with the source radio session and transmitting the frozen state to the target ANC. The target ANC may subsequently unfreeze the received state and further unlock the radio session, hence resuming control of the AT (e.g., until the need for another radio session transfer arises). After radio session transfer, the source ANC may remove the communication route between the data network and the AT via the source ANC. It may also delete the source radio session associated with the AT.

Various aspects, embodiments, and features are described in further detail below.

FIGS. 2a-2d show an embodiment 200 of connected-state radio session transfer in a wireless communication system, where a sequence of schematic diagrams is shown to complement the description. For clarity and simplicity, one ANT is explicitly shown in these figures. As further described below (e.g., see FIGS. 5a-5c), the general procedures illustrated here are also applicable to connected-state radio session transfer involving an AT in communication with a plurality of ANTs.

Figure 2A:
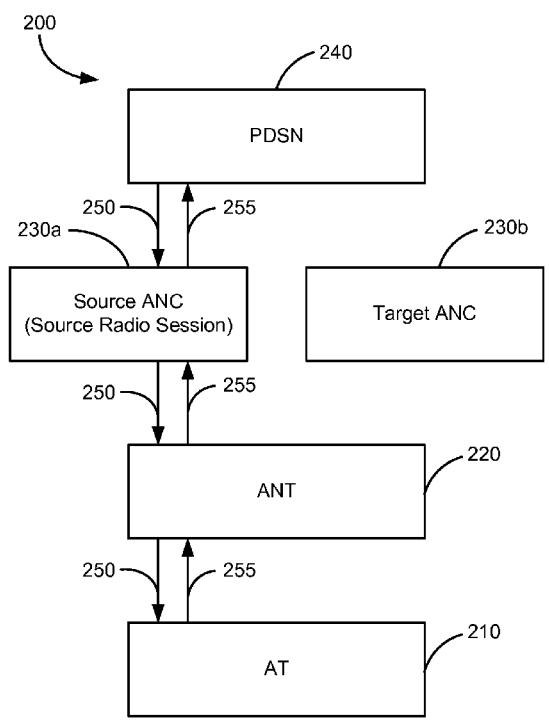
FIGS. 2a-2d show an embodiment of connected-state radio session transfer in a wireless communication system.

In FIG. 2a, an AT 210 is in connected state and serviced by an ANT 220 along with a source ANC 230a via a forward link route 250 and a reverse link route 255. Source ANC 230a may be in communication with a data network (not explicitly shown) via a PDSN 240. The situation with AT 210 may be such that source ANC 230a decides to transfer the radio session (termed "source radio session" herein) associated with and hence control of AT 210 to a target ANC 230b. (In one embodiment, for example, source ANC 230a may detect a handoff condition associated with AT 210, as further described below.) Such radio session/control transfer may be termed "ANC handoff" herein.

Figure 2B:
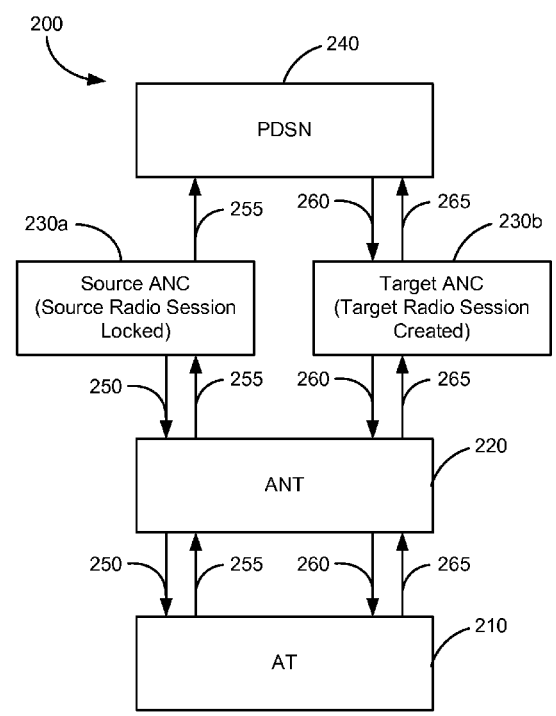

FIG. 2b shows that source ANC 230a may begin the radio session transfer by first locking the source radio session associated with AT 210. The term "locking" herein may include causing the radio session to be non-negotiable. In one embodiment, for example, such may include permitting ongoing radio session configurations and/or attributes to be updated, but prohibiting new radio session configurations and/or attributes to be initiated (e.g., by AT 210). Protocols (e.g., radio link protocols (RLPs)) for data flow on a forward link route and/or a reverse link route in connection with AT 210 may continue operating during radio session transfer, so as to maintain AT 210 being in connected state. Locking the radio session eliminates the need for continually synchronizing the radio session changes between source ANC 230a and target ANC 230b. Source ANC 230a may also inform AT 210 the locking of the source radio session.

Along with locking the source radio session, source ANC 230a may instruct target ANC 230b to create a radio session (termed "target radio session" herein) corresponding with the source radio session for AT 210, as shown in FIG. 2b. In one embodiment, source ANC 230a may for example inform target ANC 230b the underlying protocols associated with the source radio session, and target ANC 230b may create the target radio session based on such protocols. Source ANC 230a may also instruct target ANC 230b to establish a new communication route via the target ANC 230b, e.g., including a forward link route 260 and a reverse link route 265, between AT 210 and PDSN 240. To facilitate such, source ANC 230a may instruct AT 210 to set up protocols (e.g., radio link protocols (RLPs)) for purpose of the new communication route. Target ANC 230b may also instruct ANT 220 (or each ANT in AT 210's active set) to set up protocols (e.g., RLPs) for purpose of the new communication route. In one embodiment, for example, a new link-layer route may be established via target ANC 230b and provide for the new communication route between AT 210 and PDSN 240, while maintaining the existing link-layer route via source ANC 230b. (Each link-layer route may be a separate link interface, e.g., having separate network layer header compression and RLP instances.) As a result, AT 210 has two communication routes with PDSN 240, one via source ANC 230a and another via target ANC 230b, as shown in FIG. 2b. (Note, in some embodiments, source ANC 230a may remove or deactivate its forward link connection with PDSN 240 for purpose of AT 210, as shown by removal of the section of forward link route 250 between source ANC 230a and PDSN 240 in FIG. 2b, in coordination with target ANC 230b establishing its forward link connection with PDSN 240.)

Figure 2C:
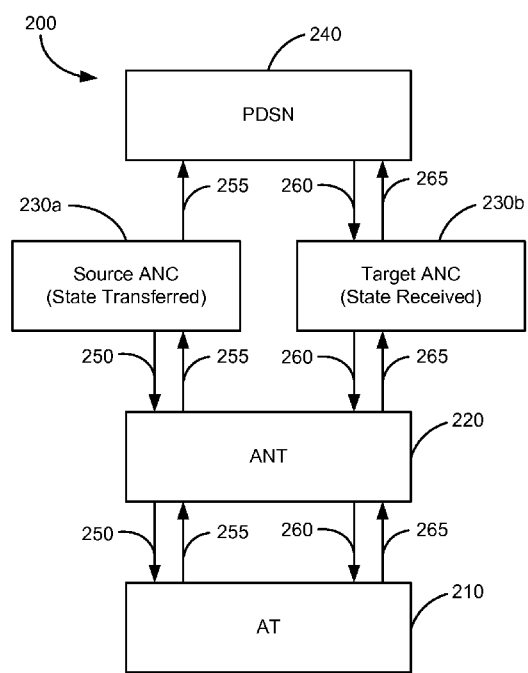
Figure 2D:
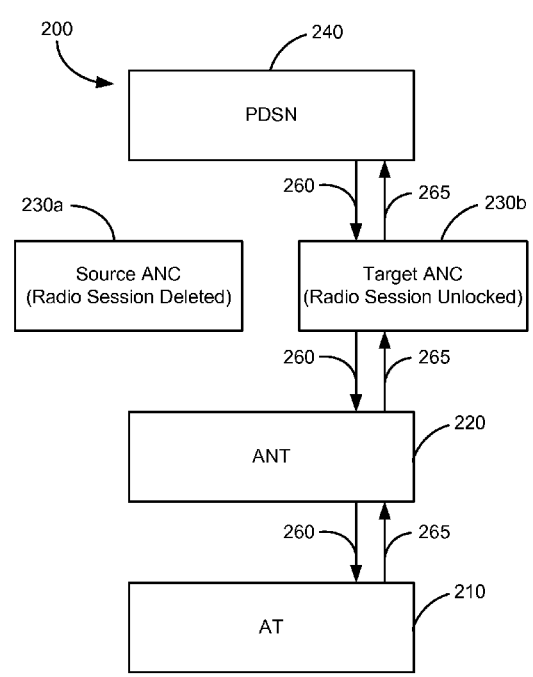

Subsequently, source ANC 230a may transfer a state associated with the source radio session to target ANC 230b, hence control of AT 210, as illustrated in FIG. 2c. In one embodiment, source ANC 230a may freeze (e.g., take a snapshot and hold any further operation of) a state associated with the source radio session and transmit the "frozen" state to target ANC 230b. Upon receiving the state, target ANC 230b may unfreeze it and further unlock the radio session associated with AT 210, as shown in FIG. 2d. Target 230b may also inform AT the unlocking of the radio session. As a result, AT 210 is now under the sole control of ANC 230b (which may act as a "source" ANC when the need for another radio session transfer arises).

FIG. 2d also shows that after the radio session transfer, source ANC 230a may remove (or deactivate) its reverse link connection with PDSN for purpose of AT 210. Source 230a may also delete the source radio session associated with AT 210. AT 210 may also remove (or deactivate) its forward link route and reverse link route in connection with source ANC 230a. In one embodiment, for example, the link-layer route between AT 210 and PDSN 240 via source ANC 230a may be removed, e.g., once the remaining queues in the RLP transmit and retransmit buffers are emptied in this route.

In some embodiments, after transferring the radio session associated with AT 210, target ANT 230b may assign a new unicast access terminal identifier (UATI) to AT 210, and receives a confirmation about reception of the new UATI from AT 210. And source ANC 230a may eventually re-assign the old UATI associated with AT 210. However, to avoid the situation where source ANC 230a re-assigns the old UATI while AT 210 is still in use of it, source ATC 230a should hold the old UATI until it is notified by target ANC 230b that AT 210 no longer listens to the old UATI or uses the old UATI to form its transmitted signals.

As illustrated in FIGS. 2a-2d above, there are two routes on each link flow (e.g., forward link or reverse link) for AT 210 during radio session transfer. One route is via source ANC 230a and another is via target ANC 230b, in connection with two sets of protocols (e.g., RLPs) set up in AT 210 (and ANT 220). In other words, by adding a separate communication route (e.g., a new link-layer route) between AT 210 and PDSN 240 via target ANC 230b, while maintaining the original communication route via source ANC 230a, data may continue flowing between AT 210 and PDSN 240 throughout the radio session transfer process.

Figure 3:
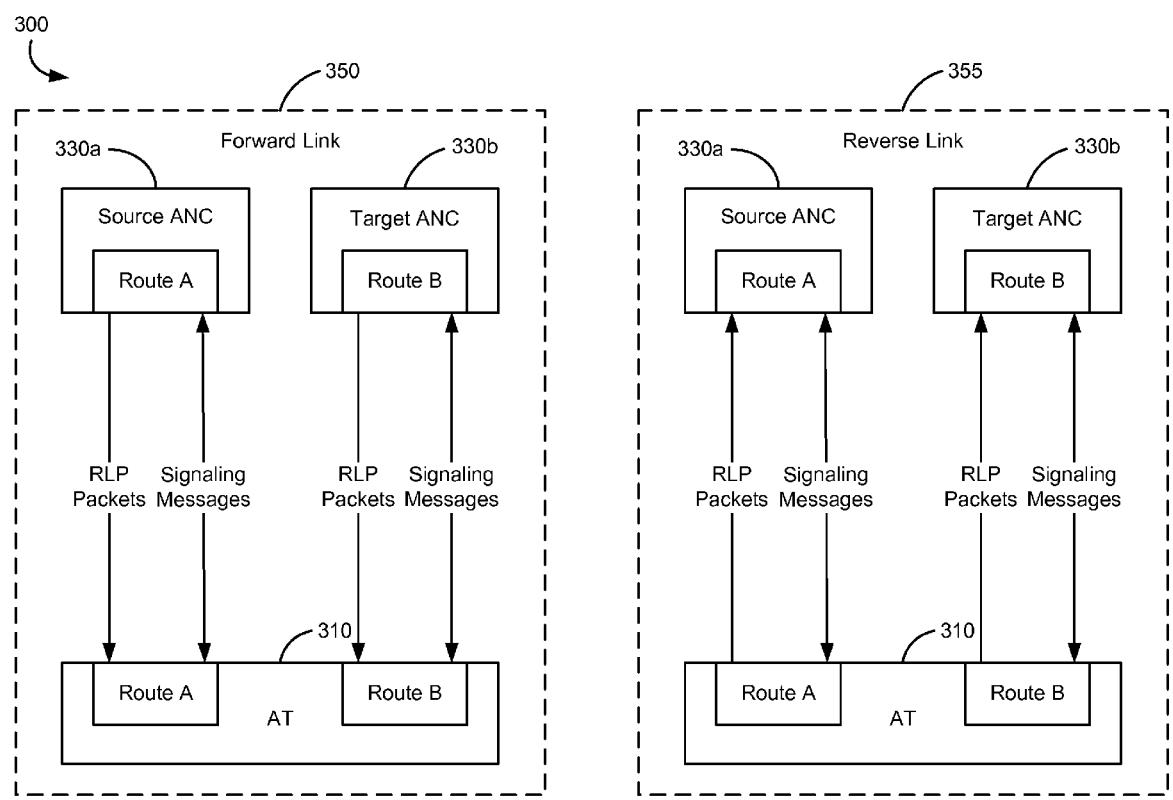
FIG. 3 shows an embodiment of a link flow diagram during connected-state radio session transfer.

FIG. 3 shows an embodiment of a link flow diagram 300 during connected-state radio session transfer. On forward link 350, a source ANC 330a may transmit data packets (e.g., RLP packets) and signaling messages to an AT 310 via route A; a target ANC 330b may transmits data packet (e.g., RLP packets) and signaling messages to AT 310 via route B. Similarly on reverse link 355, AT 310 may transmit data packets (e.g., RLP packets) and signaling message to source ANC 330a and target ANC 330b via route A and route B, respectively.

Figure 4:
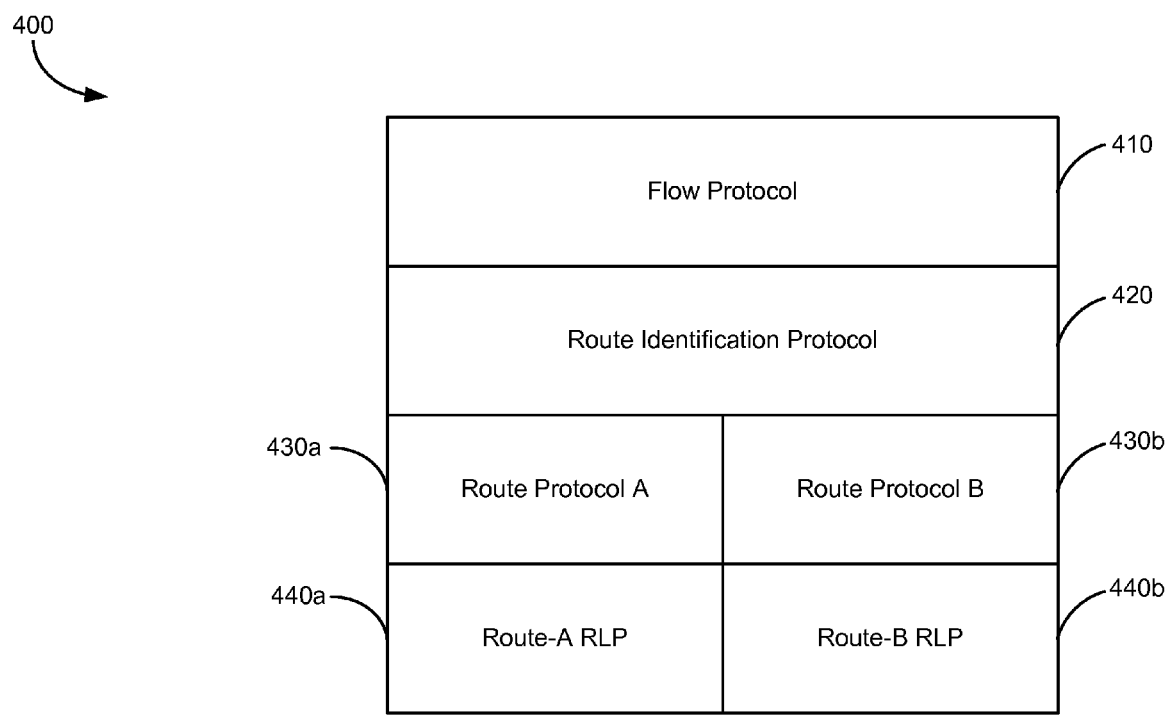
FIG. 4 shows an embodiment of a protocol architecture for data communication, which may be implemented for connected-state radio session transfer.

FIG. 4 shows an embodiment of a protocol architecture 400, which may be implemented for example at an ANC to support connected-state radio session transfer (such as described above). Protocol architecture 400 may include flow protocol 410, route identification protocol 420, followed by route protocol A 430a and route protocol B 430b, which may be further followed by route-A RLP 440a and route-B RLP 440b, respectively. Flow protocol 410 may include Internet Protocol (IP) or Point-to-Point Protocol (PPP), configured to encapsulate and transport data between a PDSN and an AT. Route identification protocol 420 may be configured to route higher layer packets to route A or route B of a link flow. Route protocol A or B may include a higher layer protocol configured to perform various duties such as header compression.

Figure 5A:
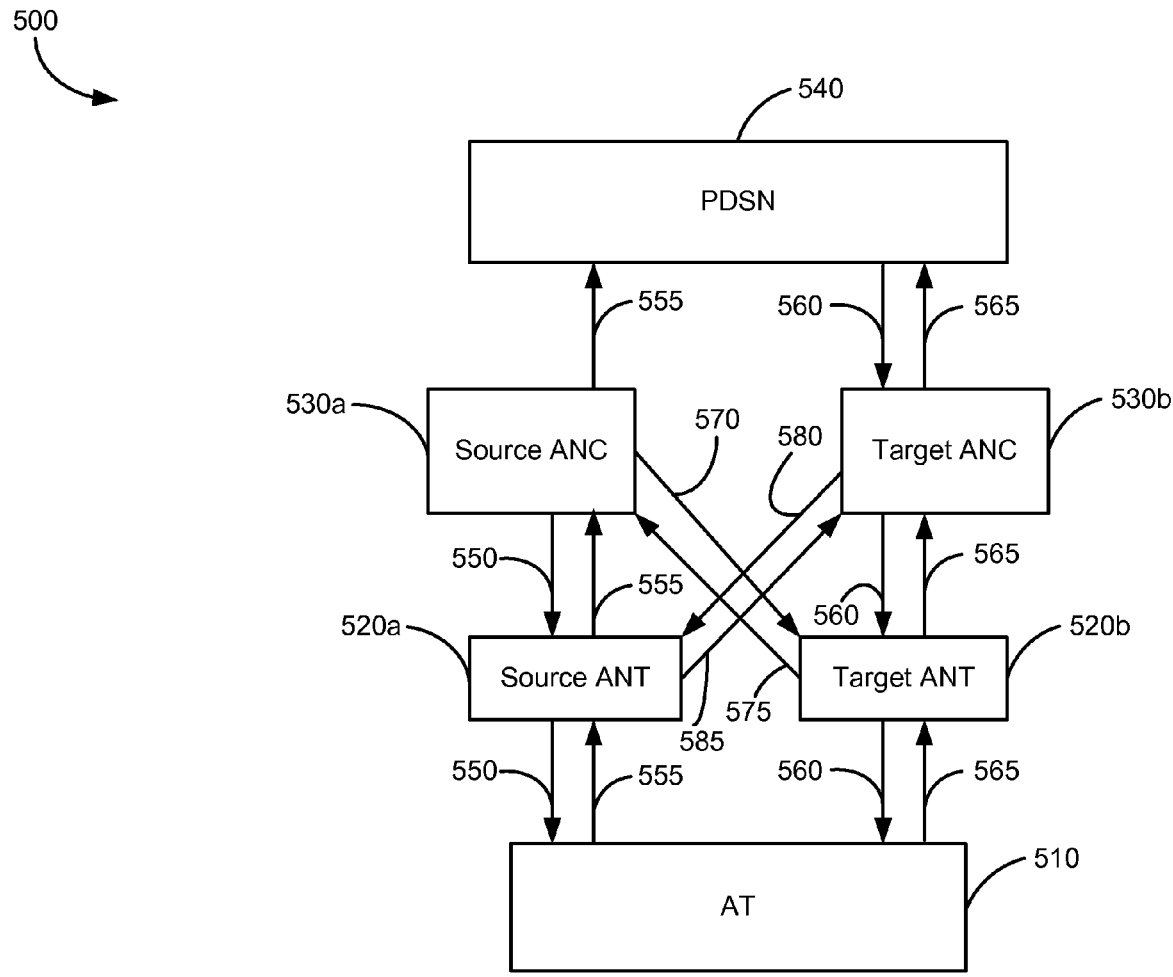
FIG. 5a shows another embodiment of connected-state radio session transfer in a wireless communication system.

FIG. 5a shows another embodiment 500 of connected-state radio session transfer in a wireless communication system. By way of example, an AT 510 may initially be in communication with a "source" ANT 520a and a source ANC 530a via a forward link route 550 and a reverse link route 555. Source ANC 530a may be in communication with a data network (not explicitly shown) via a PDSN 540. AT 510 may then enter soft handoff, e.g., communicating with source ANT 520a as well as a "target" ANT 520b (both being in AT 510's active set). ANT 520b is in communication with and under control of a target ANC 530b, hence the need for radio session transfer between source 530a and target ANC 530b in connection with the handoff of AT 510. Radio session transfer in this case may proceed in a manner similar to that described above in connection with in FIGS. 2-4, as further described below.

In the embodiment of FIG. 5a, source ANC 530a may establish a communication route, e.g., including a forward link route 570 and a reverse link route 575, with target ANT 520b. Source ANC 530a may also instruct target ANC 530b to establish a communication route, e.g., including a forward link route 580 and a reverse link route 585, with source ANT 520a. In other words, both ANCs may be in communication with all ANTs in AT 510's active set during radio session transfer. FIG. 5a also shows that a separate (or new) communication route, e.g., including a forward link route 560 and a reverse link route 565, may be established between AT 510 and PDSN 540 via target ANC 530b. In one embodiment, for example, a new link-layer route may be established via target ANC 530b and provide for a new communication route between AT 510 and PDSN 540, while maintaining the existing link-layer route between AT 510 and PDSN 540 via source ANC 530a, such as described above. (As in the case of FIG. 2b or 2c, source ANC 530a may remove its forward link connection with PDSN 540, in coordination with target ANC 530b establishing its forward link connection with PDSN 540.)

Figure 5B:
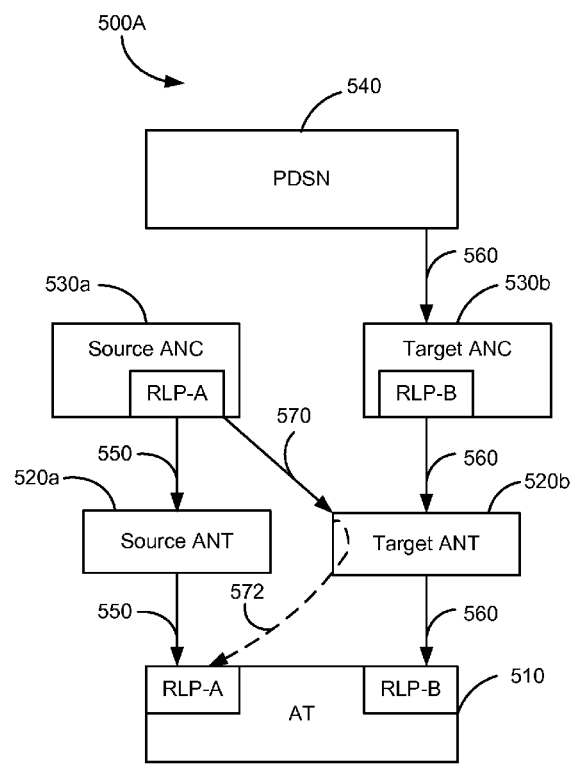
Figure 5C:
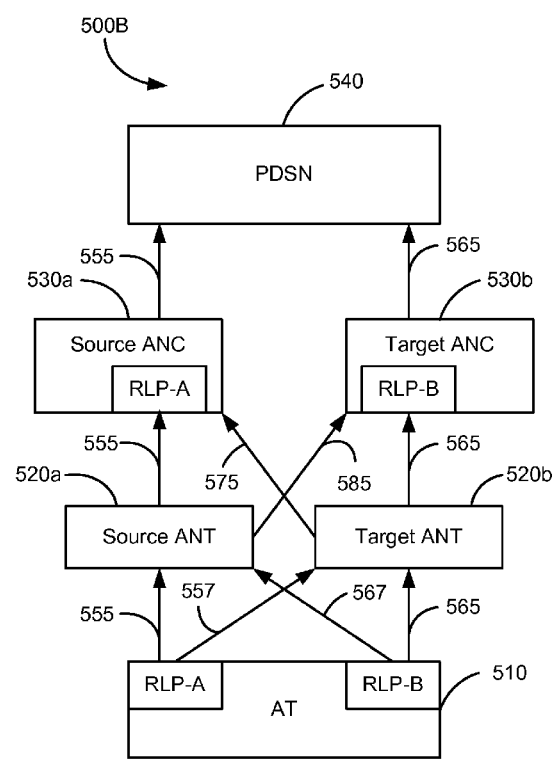

FIGS. 5b-5c shows an implementation of the embodiment of FIG. 5a, where FIG. 5b shows an embodiment 500A on forward link, and FIG. 5c shows an embodiment 500B on reverse link. Like elements are labeled by like numerals in FIGS. 5a-5c. By way of example, the communication routes between PDSN 540 and AT 510 via source ANC 520a and target ANC 520b may be provided by two separate link-layer routes, respectively. Source ANC 530a and target ANC 530b may each have its own RLP instance (e.g., source ANC 530a being associated with RLP-A and target ANC 530b associated with RLP-B). AT 510 may have both RLP-A and RLP-B, for example. (In one embodiment, AT 510 may establish RLP-B upon being instructed by source ANC 530a. AT 510 may activate RLP-B and start sending RLP-B packets on reverse link upon reception of RLP-B packets, or upon being instructed by target ANC 530b.) Further, target ANT 520b may be selected as the serving sector for AT 510.

On forward link as shown in FIG. 5b, data flow from PDSN 540 may be switched from source ANC 530a to target ANC 530b, e.g., upon target ANC 530b establishing its forward link connection with PDSN 540 for purpose of AT 510. In one embodiment, source ANC 530a and target ANC 530b may send data packets (e.g., RLP-A packets and RLP-B packets, respectively) only to the serving sector (e.g., target ANT 520b), which may in turn forward the received data packets to AT 510 by way of their respective RLP instances. For purpose of illustration, phantom line 572 shows how RLP-A packets from source ANC 530a may be routed from target ANT 520b to AT 510.

On reverse link as shown in FIG. 5c, AT 510 may send data packets (e.g., RLP-A packets and RLP-B packets) to source ANT 520a and target ANT 520b (e.g., by way of their respective RLP instances). For purpose of illustration, arrowed lines 555, 557 show how RLP-A packets from AT 510 may be routed to source ANT 520*a* and target ANT 520*b*, respectively. Similarly, arrowed lines 565, 567 show how RLP-B packets from AT 510 may be routed to target ANT 520*b* and source ANT 520*a*, respectively. Each ANT may then forward the data packets received from AT 510 to both source ANC 530*a* and target ANC 530*b*. Source ANC 530*a* may forward RLP-A packets to PDSN 540, and discard RLP-B packets. Target ANC 530*b* may forward RLP-B packets to PDSN 540, and discard RLP-A packets.

Source ANC 530*a* may be responsible for handling signaling messages during radio session transfer. In one embodiment, source ANC 530*a* may for example process all signaling message headers and forward RLP-B signaling messages to target ANC 530*b*. Source ANC 530*a* may also add signaling protocol (e.g., SLP) headers to signaling messages received from target ANC 530*b* and transmit them on forward link (e.g., to the serving sector). Source ANC 530*a* may further send updated radio session state information records (SSIRs) and/or other radio session configuration/attribute updates to target ANC 530*b*. Target ANC 530*b* may forward signaling messages on forward link to source ANC 530*a*. Target ANC 530*b* may also buffer all signaling messages (e.g., to be processed after transfer control). Target ANC 530*b* may further perform its own serving sector/active set update based on the information received from source ANC 530*a*. (Source ANC 530*a* and target ANC 530*b* reverse their responsibilities after target ANC takes control of the radio session associated with AT 510.)

In the above, there may be situations where source ANC 530*a* and target ANC 530*b* both send RLP packets to the serving sector (or each ANT in AT 510's active set). (For example, even when data packets from PDSN 540 are routed to target ANC 530*b*, source ANC 530*a* may still need to retransmit some data packets.) Data packets from each ANC may be queued in a scheduler queue in each ANT (or the serving sector). Because the delay through the source route may be different from that through the target route, data packets leaving PDSN 540 in one order may arrive at AT 510 in a different order. To avoid such "out-of-order" delivery, each ANT may give a "tie-breaking" advantage to source ANC 530*a*. In one embodiment, for example, each ANT may receive and assign a first priority to data packets from source ANC 530*a*; receive and assign a second priority to data packets from target ANC 530*b*. The first priority may be higher than the second priority, so that each ANT sends the packets with the first priority to AT 510 before sending data packets with the second priority.

In the embodiment of FIG. 5*a* or FIGS. 5*b*-5*c*, there may be situations where one or more new ANTs (not explicitly shown) need to be added to AT 510's active set during radio session transfer. For example, AT 510 may report to source ANC 530*a* new ANTs with strong pilot signals, some of which may be under control of target ANC 530*b* and others under control of source ANC 530*a*. In one embodiment, source ANC 530*a* may establish communication with those ANTs under control of target ANC 530*b*. Source ANC 530*a* may also instruct target ANC 530*b* to establish communication with those ANTs under control of source ANC 530*a*. The remaining procedures may proceed in a manner similar to those described above.

One or more ANTs (not explicitly shown) may also be removed from AT 510's active set during radio session transfer. For example, AT 510 may report to source ANC 530*a* one or more ANTs with deteriorated pilot signals, some of which may be under control of target ANC 530*b* and others under control of source ANC 530*a*. Source ANC 530*a* may inform target ANC 530*b* those ANTs that are under control of source ANC 530*a* and to be removed. Target ANC 530*b* may accordingly remove its connection with such ANTs. Source ANC 530*a* may also remove those ANTs that are under control of target ANC 530*b*.

Embodiments disclosed herein (such as described above in FIGS. 2-5) provide some embodiments of connected-state radio session transfer in a wireless communication system. There are other embodiments and implementations.

Figure 6:
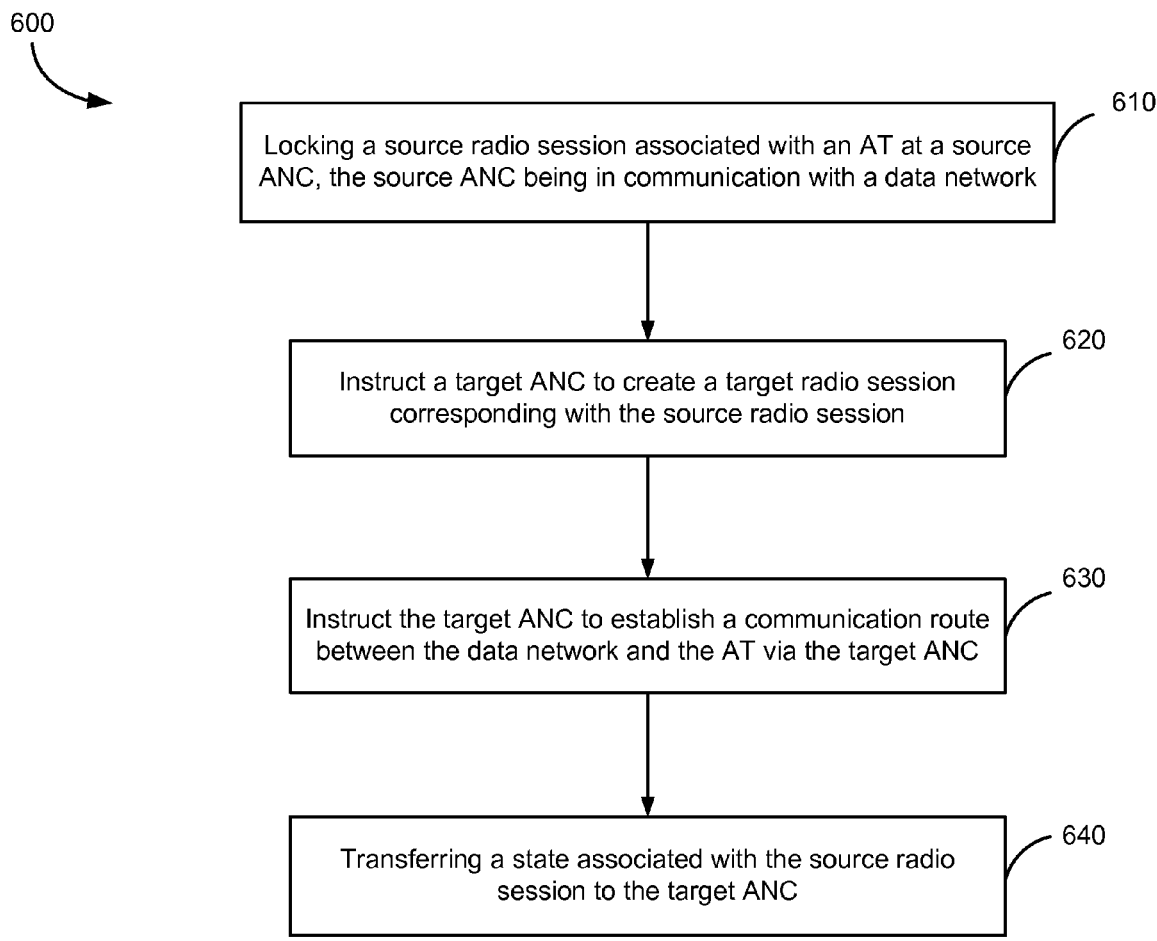
FIG. 6 shows a flow diagram of a process, which may be used in one embodiment for connected-state radio session transfer.

FIG. 6 shows a flow diagram of a process 600, which may be used in one embodiment to provide connected-state radio session transfer. Step 610 locks a source radio session associated with an AT at a source ANC, where the source ANC is in communication with a data network (e.g., via a PDSN). Step 620 instructs a target ANC to create a target radio session corresponding with the source radio session. Step 630 instructs the target ANC to establish a communication route (e.g., including a forward link route and a reverse link route) between the data network and the AT via the target ANC. Step 640 transfers a state associated with the source radio session to the target ANC. In one embodiment, step 640 may include freezing (e.g., taking a snapshot and holding any further operation of) a state associated with the source radio session and transmitting the frozen state to the target ANC.

Process 600 may further include instructing the AT to set up protocols in connection with the communication route between the data network and the AT via the target ANC. In one embodiment, the protocols may include RLPs. Process 600 may also include instructing the target ANC to establish communication with each ANT in the AT's active set. Process 600 may additionally include establishing communication with at least one ANT in the AT's active set. In some embodiments, Process 600 may also include removing a communication route between the source ANC and the AT, and/or delete the source radio session associated with the AT, after transferring the state.

Figure 7:
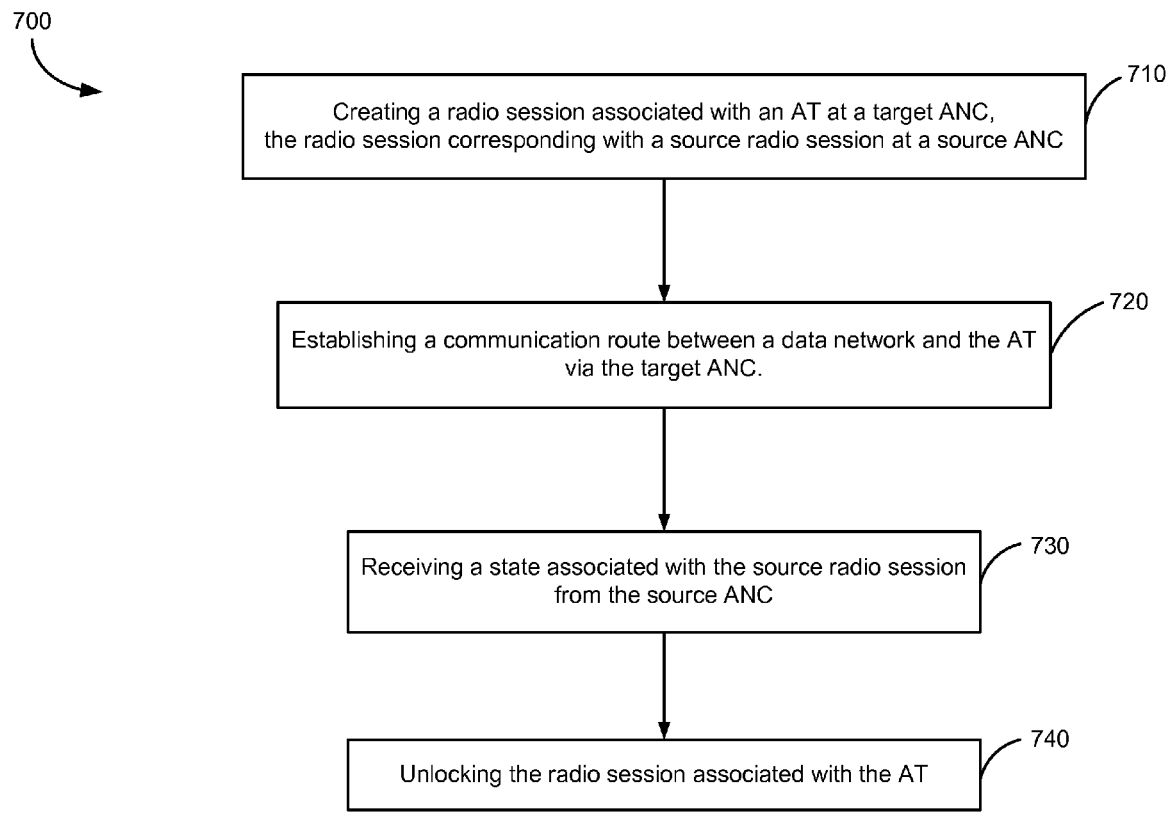
FIG. 7 shows a flow diagram of a process, which may be used in another embodiment for connected-state radio session transfer.

FIG. 7 shows a flow diagram of a process 700, which may be used in another embodiment to provide connected-state radio session transfer. Step 710 creates a radio session associated with an AT at a target ANC, the radio session corresponding with a source radio session at a source ANC. Step 720 establishes a communication route (e.g., including a forward link route and a reverse link route) between a data network and the AT via the target ANC. Step 720 may also include establishing communication with each ANT in the AT's active set. Step 730 receives a state associated the source radio session from the source ANC. In one embodiment, step 730 may also include unfreezing the received state. Step 740 unlocks the radio session associated with the AT. Process 700 may further include informing the AT the unlocking of the radio session.

Figure 8:
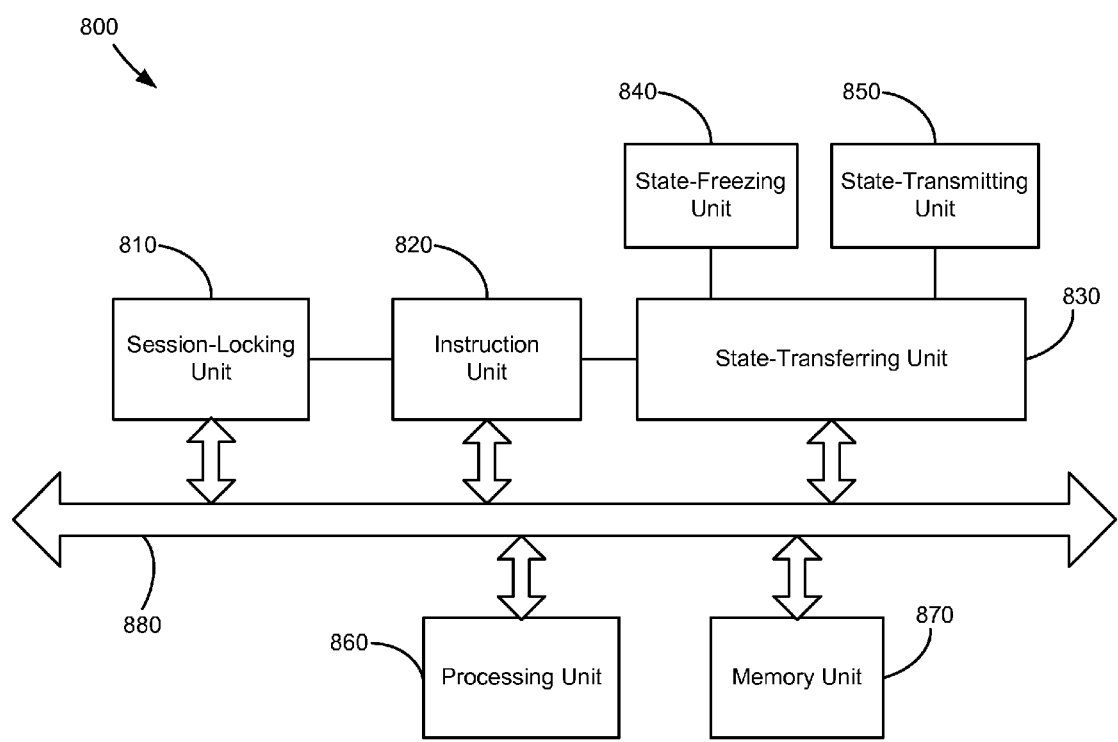
FIG. 8 shows a block diagram of an apparatus, in which some disclosed embodiments may be implemented.

FIG. 8 shows a block diagram of an apparatus 800, which may be used to implement some disclosed embodiments (such as described above). By way of example, apparatus 800 may include a session-locking unit (or module) 810 configured to lock a source radio session associated with an AT at a source ANC; an instruction unit 820 configured to instruct a target ANC to create a target radio session corresponding with the source radio session and to establish a communication route between a data network (e.g., via a PDSN) and the AT via the target ANC; and a state-transferring unit 830 configured to transfer a state associated with the source radio session to the target ANC. In one embodiment, state-transferring unit 830 may further include a state-freezing unit 840 configured to freeze (e.g., take a snapshot and hold any further operation of) a state associated with the source radio session; and a state-transmitting unit 850 configured to transmit the frozen state to the target ANC. In some embodiments, instruction unit 820 may also be configured to instruct the target ANC to establish communication with each ANT in the AT's active set.

In apparatus 800, session-locking unit 810, instruction unit 820, and state-transferring unit 830 may be coupled to a communication bus 880. A processing unit 860 and a memory unit 870 may also be coupled to communication bus 880. Processing unit may be configured to control and/or coordinate the operations of various units. Memory unit 870 may embody instructions to be executed by processing unit 860.

Figure 9:
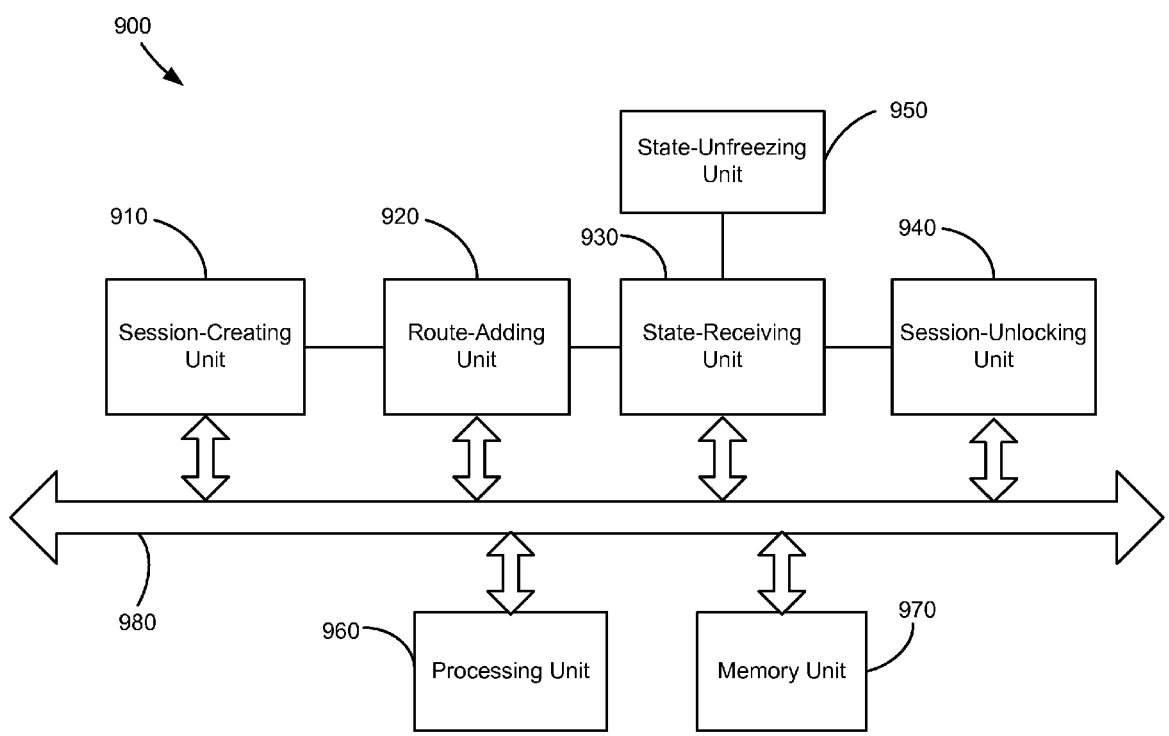
FIG. 9 shows a block diagram of an apparatus, in which some disclosed embodiments may be implemented.

FIG. 9 shows a block diagram of an apparatus 900, which may also be used to implement some disclosed embodiments (such as described above). By way of example, apparatus 900 may include a session-creating unit 910 configured to create a radio session associated with an AT in correspondence with a source radio session at a source ANC; a route-adding (or establishing) unit 920 configured to establish a communication route between a data network (e.g., via a PDSN) and the AT via the target ANC; a state-receiving unit 930 configured to receive a state associated with the source radio session from the source ANC; and a session-unlocking unit 940 configured to unlock the radio session associated with the AT. In one embodiment, state-receiving unit 930 may further include a state-unfreezing unit 950 configured to unfreeze the received state. In some embodiments, route-adding unit 920 may be further configured to establish communication with each ANT in the AT's active set.

In apparatus 900, session-creating unit 910, route-adding unit 920, state-receiving unit 930, state-unfreezing unit 940, and session-unlocking unit 950 may be coupled to a communication bus 980. A processing unit 960 and a memory unit 970 may also be coupled to communication bus 980. Processing unit may be configured to control and/or coordinate the operations of various units. Memory unit 970 may embody instructions to be executed by processing unit 960.

Figure 10:
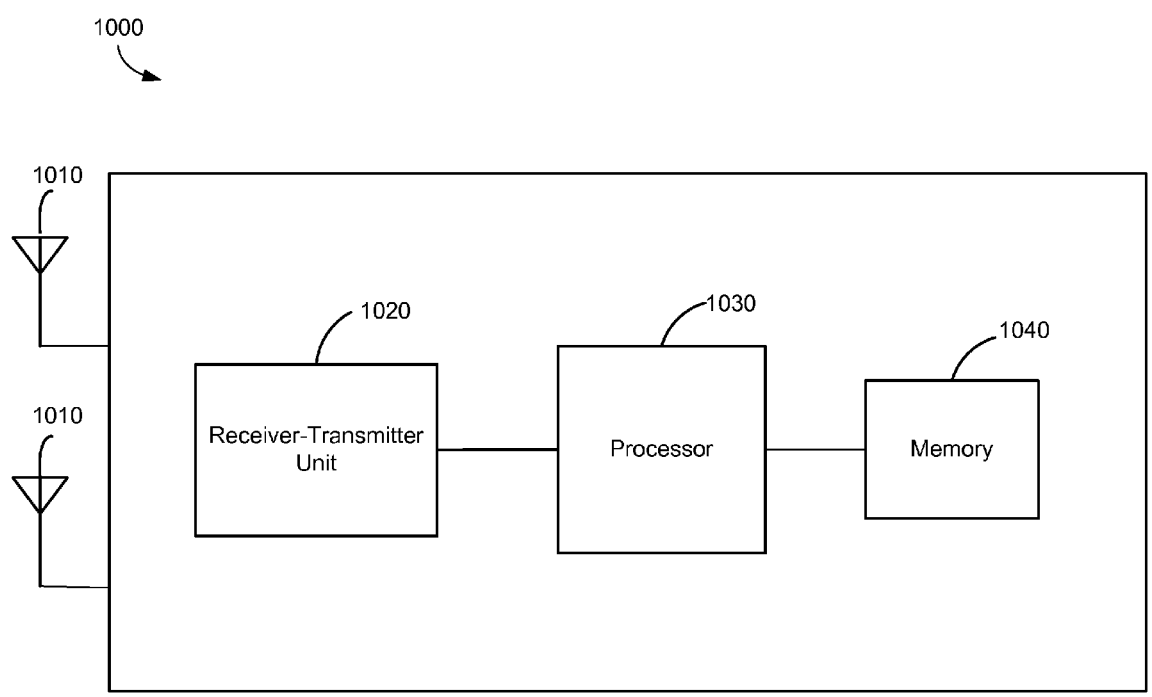
FIG. 10 shows a block diagram of an apparatus for wireless communications.

FIG. 10 shows a block diagram of an apparatus 1000, in which some disclosed embodiments (such as described above) may be implemented. By way of example, apparatus 1000 includes one or more antennas 1010; a receiver-transmitter unit 1020; and a processor 1030, in communication with receiver-transmitter unit 1020. Apparatus 1000 may further include a memory 1040, in communication with processor 1030. (For simplicity and illustration, two antennas 1010 are explicitly shown. There may be any number of antennas in a system. Antennas 1010 may each be capable of receiving and transmitting, or serve as separate receiver and transmitter antennas.)

In apparatus 1000, receiver-transmitter unit 1020 may be configured to perform various desired functions on the signals received at antennas 1010, such as down-conversion (e.g., from RF to baseband), demodulation, decoding, as well as encoding, modulation, up-conversion (e.g., from baseband to RF), etc. Processor 1030 may be configured to perform various functions/steps, such as described below. Memory 1040 may embody instructions to be executed by processor 1030 to carry out some functions.

In some embodiments, processor 1030 may be configured to incorporate and/or implement the functions of session-locking unit 810, instruction unit 820, and state-transferring unit 830 (which may also include state-freezing unit 840 and state-transmitting unit 850) of FIG. 8.

In other embodiments, processor 1030 may be configured to incorporate and/or implement the functions of session-creating unit 910, route-adding unit 920, state-receiving unit 930 (which may also include state-unfreezing unit 950), and session-unlocking unit 940 of FIG. 9.

Various units/modules in FIGS. 8-10 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit (e.g., memory 1040) and executed by a processor (e.g., processor 1030). The memory unit may be implemented within the processor or external to the processor, in which case it can be communicatively coupled to the processor via various means known in the art.

Various disclosed embodiments may be implemented in an ANC, an AN, and other wireless communication systems to provide connected-state radio session transfer.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
creating a radio session associated with an access terminal at a target access network controller, the radio session corresponding with a source radio session at a source access network controller, wherein the source radio session is locked, wherein locking permits updating existing configurations and attributes associated with the source radio session but prevents initiation of new configurations and attributes for the source radio session by at least one of the access terminal or the source access network controller, establishing a communication route between a data network and the access terminal via the target access network controller;
receiving, by the target access network controller, a frozen state associated with the source radio session from the source access network controller, wherein the frozen state includes a snapshot of any data being communicated through the source radio session when freezing occurred;
unfreezing the received frozen state; and
unlocking the radio session.

2. The method of claim 1, further comprising informing the access terminal of the unlocking of the radio session.

3. The method of claim 1, further comprising assigning a unicast access terminal identifier to the access terminal at the target access network controller.

4. The method of claim 1, wherein the communication route includes a forward link route and a reverse link route.

5. The method of claim 1, further comprising establishing communication with each access network transceiver in an active set associated with the access terminal.

6. The method of claim 1, wherein the access terminal is under the sole control of the target access network controller after unfreezing the received frozen state and unlocking the radio session associated with the access terminal.

7. An apparatus adapted for wireless communications, comprising:
a session-creating unit configured to create a radio session associated with an access terminal at a target access network controller, the radio session corresponding with a source radio session at a source access network controller, wherein the source radio session is locked, wherein locking permits updating existing configurations and attributes associated with the source radio session but prevents initiation of new configurations and attributes for the source radio session by at least one of the access terminal or the source access network controller;
a route-adding unit configured to establish a communication route between the access terminal and a data network via the target access network controller;
a state-receiving unit configured to receive a frozen state associated with the source radio session from the source access network controller, wherein the frozen state includes a snapshot of any data being communicated through the source radio session when freezing occurred; and
a state-unfreezing unit configured to unfreeze the received frozen state; and
a session-unlocking unit configured to unlock the radio session associated with the access terminal.

8. The apparatus of claim 7, wherein the route-adding unit is further configured to establish communication with each access network transceiver in an active set associated with the access terminal.

9. The apparatus of claim 7, further comprising a processing unit in communication with the session-creating unit, the route-adding unit, and the state-receiving unit.

10. The apparatus of claim 9, further comprising a memory unit in communication with the processing unit.

11. The apparatus of claim 7, wherein the access terminal is under the sole control of the target access network controller after unfreezing the received frozen state and unlocking the radio session associated with the access terminal.

12. An apparatus adapted for wireless communications, comprising:
means for creating a radio session associated with an access terminal at a target access network controller, the radio session corresponding with a source radio session at a source access network controller, wherein the source radio session is locked, wherein locking permits updating existing configurations and attributes associated with the source radio session but prevents initiation of new configurations and attributes for the source radio session by at least one of the access terminal or the source access network controller;
means for establishing a communication route between the access terminal and a data network via the target access network controller;
means for receiving a frozen state associated with the source radio session from the source access network controller, wherein the frozen state includes a snapshot of any data being communicated through the source radio session when freezing occurred;
means for unfreezing the received frozen state; and
means for unlocking the radio session associated with the access terminal.

13. The apparatus of claim 12, wherein the means for establishing further include establishing communication with each access network transceiver in an active set associated with the access terminal.

14. The apparatus of claim 12, further comprising means for informing the access terminal of the unlocking of the radio session.

15. The apparatus of claim 12, further comprising means for assigning a unicast access terminal identifier to the access terminal at the target access network controller.

16. The apparatus of claim 12, wherein the communication route includes a forward link route and a reverse link route.

17. The apparatus of claim 12, wherein the means for establishing are further configured to establish communication with each access network transceiver in an active set associated with the access terminal.

18. The apparatus of claim 12, wherein the access terminal is under the sole control of the target access network controller after unfreezing the received frozen state and unlocking the radio session associated with the access terminal.

19. A non-transitory computer readable medium comprising instructions executable by a processor configured to:
create a radio session associated with an access terminal at a target access network controller, the radio session corresponding with a source radio session at a source access network controller, wherein the source radio session is locked, wherein locking permits updating existing configurations and attributes associated with the source radio session but prevents initiation of new configurations and attributes for the source radio session by at least one of the access terminal or the source access network controller;
establish a communication route between the access terminal and a data network via the target access network controller;
receive a frozen state associated with the source radio session from the source access network controller, wherein the frozen state includes a snapshot of any data being communicated through the source radio session when freezing occurred; and
unfreeze the received frozen state; and
unlock the radio session associated with the access terminal.

* * * * *